United States Patent Office 3,507,610
Patented Apr. 21, 1970

3,507,610
FLAME-RETARDANT TRIS(HALOALKYL) PHOSPHITE-MODIFIED CELLULOSE AND PROCESS THEREFOR
Giuliana C. Tesoro, Dobbs Ferry, N.Y., and Stephen B. Sello, Cedar Grove, N.J., assignors to J. P. Stevens & Co., Inc., New York, N.Y., a corporation of Delaware
No Drawing. Filed Sept. 12, 1967, Ser. No. 667,062
Int. Cl. C08b 27/58; D06m 13/00
U.S. Cl. 8—120          12 Claims

ABSTRACT OF THE DISCLOSURE

Flame-retardant properties are imparted to cellulose by reaction of the cellulose with a tris(haloalkyl) phosphite, for example tris(2-chloroethyl) phosphite, at elevated temperatures, desirably 130–170° C., in the presence of a chemically inert liquid medium which swells the cellulose, such as dimethylformamide, whereby phosphorus is chemically bound to the cellulose to provide a durable flame-retardant treatment. The amount of phosphorus required to provide flame-retardant properties is reduced by also treating the cellulose with an organic nitrogen-containing compound.

DESCRIPTION OF THE INVENTION

Having briefly summarized the disclosure, the present invention is concerned with imparting flame-retardant properties to cellulose by reaction of the cellulose with a tris(haloalkyl) phosphite. In a preferred embodiment, this invention is concerned with tris(haloalkyl) phosphite-modified cellulose which has also been treated with an organonitrogen compound to impart improved flame-retardant properties thereto.

It has long been known that flame-retardant properties may be imparted to cellulose, particularly in a textile form, by treatment with phosphoric acid or compounds capable of forming phosphoric acid or its anhydride on burning. However, these methods are generally unacceptable due to serious degradation of the cellulose as well as lack of durability of the treatment.

More recently treatments employing organophosphorus compounds have been developed in an effort to provide flame retardance without concurrent damage to the cellulose and to render the phosphorus-containing agent resistant to removal during laundering. Although many of these treatments are in commercial use today, none has been completely successful due to the high cost of the organophosphorus compound and the high degree of add-on of organophosphorus compound required to provide flame-retardant properties. In addition many of the previously employed treatments are acidic in nature or require acidic catalysts to insolubilize the compound on the cellulose. These acidic conditions frequently cause undesirable degradation of the cellulosic substrate. Polymeric surface deposits produced also impair surface properties and cause undesirable side effects.

It has been discovered by the present invention that certain tris(haloalkyl) phosphites are well suited as flame-retardant agents for cellulose. In particular, these compounds are readily available and react with cellulose without forming objectionable amounts of surface deposits and without requiring acidic catalysts to produce a flame-retardant treatment which is durable to laundering and free of undesirable side effects.

The phosphites employed in accordance with this invention may be generally represented by the formula:

$$P(OC_nH_{2n}X)_3 \qquad (I)$$

wherein $n$ is an integer having a value of at least 2 and X is halogen, with the proviso that the halogen is separated from oxygen by at least two carbons.

Although the maximum value of $n$ is not narrowly critical, and can range up to 10 or higher if desired, preferred compounds are the tris(halo-lower-alkyl) phosphites wherein $n$ is not greater than about 4.

By the term "halogen" is meant an element of Group VII-A of the Periodic Table having an atomic number of from 17 to 53, inclusive, i.e., chlorine, bromine and iodine, with chlorine being preferred.

Illustrative examples of the preferred tris(haloalkyl) phosphites include tris(2-chloroethyl) phosphite, tris(2-bromoethyl) phosphite, tris(2-iodoethyl) phosphite, tris (2-chloropropyl) phosphite, tris(2-chloro-1-methylethyl) phosphite, tris(3-chloropropyl) phosphite, tris(2-chlorobutyl) phosphite, tris(3-chlorobutyl) phosphite, tris(4-chlorobutyl) phosphite, tris(2 - chloro - 1 - methylpropyl) phosphite, tris(3-bromo-2-methylpropyl) phosphite and the like.

The treatment of this invention comprises contacting cellulose with a solution of a tris(haloalkyl) phosphite in a normally liquid organic solvent for the phosphite. Although any solvent which is chemically inert towards the tris(haloalkyl) phosphite can be employed, preferred solvents are those which are swelling agents for the cellulose to permit access of the tris(haloalkyl) phosphite to the reactive sites on the cellulose macromolecule. Particularly preferred solvents of this type are tertiary amides and lactams which may be represented by the general formula:

$$RCONR^1R^2 \qquad (II)$$

wherein R, when taken alone, is hydrogen or lower alkyl; each fo $R^1$ and $R^2$, when taken separately, is lower alkyl; and R and $R^1$, when taken together, are lower alkylene which, when taken with the N-alkylcarbamoylene radical (—$CONR^2$—), forms a 5- to 7-membered heterocyclic ring.

By the term "lower alkyl" is meant a linear or branched chain alkyl group of up to about 10, preferably about 6, carbons, such as methyl, ethyl, n-propyl, isopropyl, tert-butyl and the like, with methyl and ethyl being preferred. By the term "lower alkylene" is meant a divalent linear or branched alkylene group of up to about 10, preferably about 6, carbons, having from 3 to 5 carbons between the valence bonds. Preferred lower alkylene groups are trimethylene, tetramethylene, methyl-substituted trimethylene, and methyl-substituted tetramethylene groups.

Illustrative solvents include N,N-dimethylformamide, N,N-dimethylacetamide, 1-methyl-2-pyrrolidinone and 1,5-dimethyl-2-pyrrolidinone. Other solvents which may be employed include dimethyl sulfoxide and tetramethylene sulfone.

The cellulose is contacted with the tris(haloalkyl) phosphite solution in any suitable manner, such as immersing the cellulose in the solution, padding the cellulose with the solution, spraying the solution on the cellulose and the like. However, because the reactions involved in the process according to this invention result in the formation of haloalkanols and dihaloalkanes, the immersion technique is preferred.

Although the conditions of the reaction of the tris(haloalkyl) phosphite with the cellulose are not narrowly critical in the sense of effecting the reactions hereinafter described, they are important in achieving a desirable degree of phosphorus uptake in a commercially acceptable time. Factors which influence the reaction rate include the ratio of tris(haloalkyl) phosphite to cellulose, the form of the cellulose, the specific halogen in and the dilution of the tris(haloalkyl) phosphite, the time and temperature of the reaction as well as the swelling action of the solvent noted above.

In general, the most rapid reaction is obtained when the halogen is iodine and the slowest rate of reaction is obtained with chlorine. Nevertheless, because the tris(chloroalkyl) phosphites are more readily available and are less expensive than the bromo or iodo analogs, they are generally preferred for use in accordance with this invention.

The rate of reaction of the tris(haloalkyl) phosphite with cellulose is generally slow. Accordingly, to achieve commercially-acceptable reaction rates, it is desirable to employ the haloalkyl phosphite in substantial excess over the amount desired to be incorporated in the cellulosic substrate. Although the ratio of tris(haloalkyl) phosphite to cellulose will depend upon the various reaction conditions such as time, temperature and the like, the quantities normally employed will be from one to ten parts by weight of tris(haloalkyl) phosphite for each part by weight of cellulose. For example, in a batch process in which it is desired to incorporate approximately 2 weight percent phosphorus in an 8-ounce cotton fabric, satisfactory results can be obtained by employing 7.5 parts by weight of tris(haloalkyl) phosphite in 22.5 parts of dimethylformamide per part of cellulose. Excess tris(haloalkyl) phosphite can be recovered by distillation from the treating solution or by other suitable means.

The concentration of the phosphite in the treating solution also has an effect on the reaction rate. Thus if too dilute a solution is employed a slow reaction may result because of the low concentration of tris(haloalkyl) phosphite at the cellulosic surface. On the other hand, as noted above, it is essential that sufficient solvent be present to swell the cellulose and permit access of the alkyl phosphite to the reactive sites of the cellulose. In general it has been found that a suitable solution will contain from about 1 part by weight of organic solvent per part of phosphite to about 10 parts of solvent per part of phosphite. The optimum solvent/phosphite ratio will normally be within the range of from about 1:1 to about 5:1, with ratios of from about 2:1 to about 4:1 being especially preferred.

In general, the reaction rate increases with increasing temperature. This temperature will generally be in the range of from about 130° C. to about 170° C. when the preferred tris(haloloweralkyl) phosphites are employed.

The reaction time is that period necessary to achieve the desired phosphorus uptake and is obviously dependent upon the process variables discussed above. In general, however, when the preferred conditions are employed a phosphorus uptake within the range of 0.5 to about 3 percent, based upon cellulose, is generally obtained in from about 0.5 to about 5 hours.

On completion of the reaction, the cellulose product is removed from the solution, and then is desirably rinsed to remove unreacted phosphite compounds, as by rinsing with the solvent employed for the reaction medium and then with water. The rinsed product is then dried.

The product of this process comprises cellulose having phosphorus-containing groups bonded to the cellulose at the site of the cellulosic hydroxyl groups wherein the phosphorus is present in the form of phosphite $[(\equiv CO)_3P]$ and/or phosphonate $[(\equiv CO)_2P(O)C\equiv]$ radicals there being no more than one phosphite radical per group and wherein, when there is more than one phosphorus atom in each group, the phosphorus atoms are separated by a chain of at least 2 carbons. Because of the number of reactive sites and possible reactions involved, the chemical composition of the product cannot be simply represented, although the principal reactions involved are the condensation of a phosphite with an alcohol moiety or a haloalkyl moiety and isomerization, as illustrated by the following schematic equations:

(1) Alcohol condensation:

$$\equiv COH + P(OC\equiv)_3 \rightarrow \equiv COP(OC\equiv)_2$$

(2) Haloalkyl condensation:

$$\equiv C-X + P(OC\equiv)_3 \rightarrow \equiv CP(O)(OC\equiv)_2$$

(3) Isomerization:

$$\equiv COP(OC\equiv)_2 \rightarrow \equiv CP(O)(OC\equiv)_2$$

The initial reaction whereby phosphorus becomes chemically bound to the cellulose is the alcohol condensation, thereby providing pendant bis(haloalkoxy) phosphinoxy groups $[-OP(OC_nH_{2n}X)_2]$. These groups then may (a) isomerize in accordance with Equation 3, above, (b) undergo condensation in accordance with Equation 2 above, or (c) further react in accordance with Equation 1 above, with hydroxyls on the same or different cellulose chains.

Initial reactions are believed to take the following course predominantly. Cell-OH represents cellulose and tris(2-chloroethyl) phosphite is illustrative of tris(haloalkyl) phosphite.

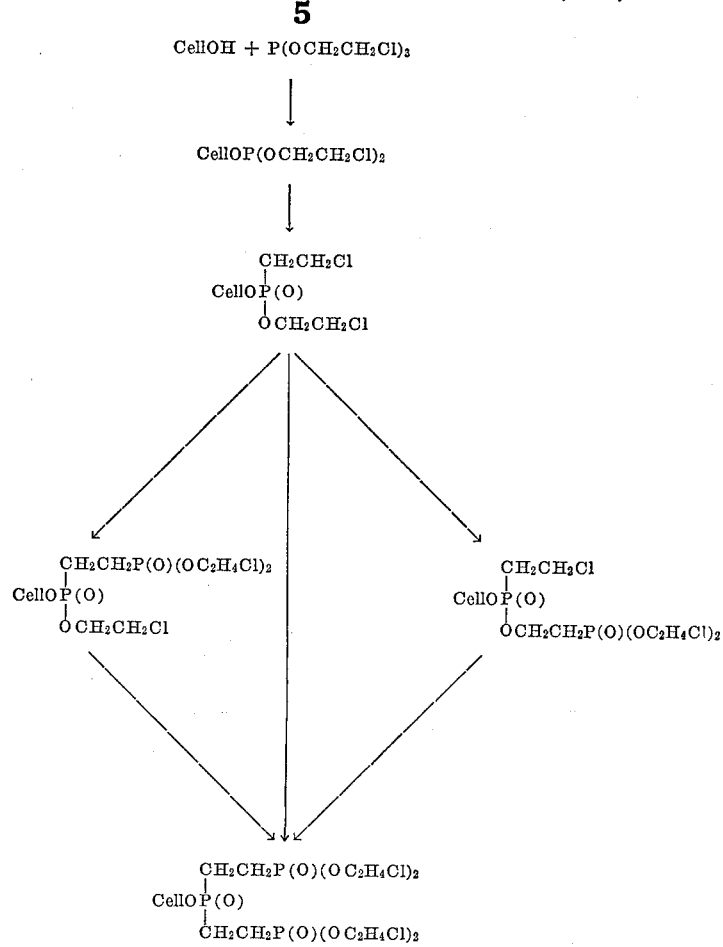

Isomerization of cellulose bis(2-chloroethyl) phosphite results in cellulose 2-chloroethyl 2-chloroethylphosphonate, a mixed ester of 2-chloroethylphosphonic acid. Condensation reactions with additional molecules of tris(2-chloroethyl) phosphite produce polyphosphonates, illustrated above.

Another, but less likely, set of phosphonates is derivable from cellulose bis(2-chloroethyl) phosphite directly, i.e., without involving the isomerized intermediate. Initial reactions, which are of relatively less importance, are believed to occur in the following sequence.

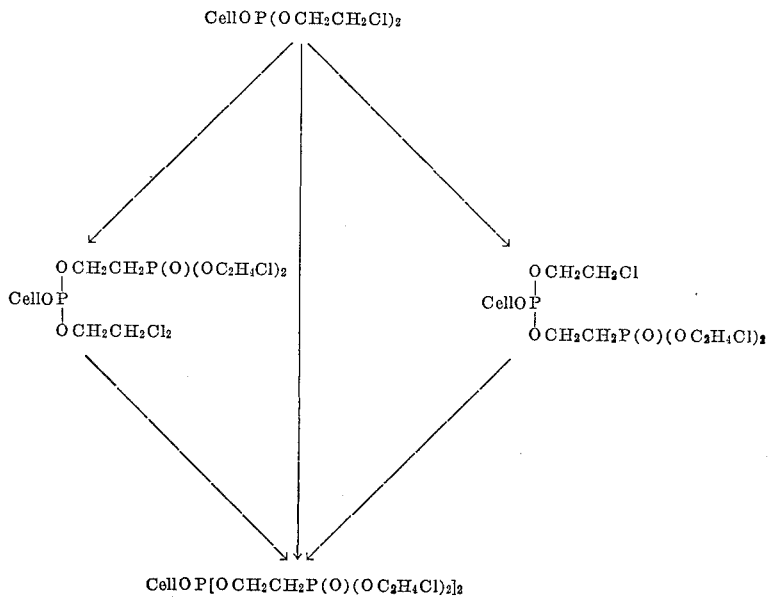

As a class, phosphonates are remarkably stable with respect to hydrolysis. This is not only true under neutral, weakly acidic, or weakly basic conditions, but even the lower esters of organic phosphonic acids do not undergo appreciable hydrolysis during many hours of heating at the boiling point in either 10% sodium hydroxide or concentrated hydrochloric acid. Cellulose derivatives of this invention made by means of tris(haloalkyl) phosphites do not lose phosphonate phosphorus by saponification. Hence the fire-retarding ability of the phosphorus-modified cellulose of this invention is maintained. This advantageous hydrolytic stability is made possible through the use of tris(haloalkyl) phosphites.

On the contrary, cellulose esters made with halogen-free organic phosphites are saponified fairly readily. As a result, phosphorus is lost from the modified cellulose, and so is flame retardancy. This is a pertinent distinction between the present invention and the prior art. It has now been discovered that tris(haloalkyl) phosphites provide a means of making a stable type of phosphorus-modified cellulose not possible with helogen-free organic phosphites as the source of phosphorus.

Referring to schematic Equations 1, 2, and 3, only Equation 1 is possible with halogen-free organic phosphites, whereas with tris(haloalkyl) phosphites, Equations 2 and 3 (both yielding phosphonates) also occur.

The cellulose-tris(haloalkyl) phosphite reaction product can be modified in several ways. For example, pendant haloalkyl groups may be reacted with other compounds to replace the halogen which, although a known synergist for flame retardance due to phosphorus, has a tendency to degrade the cellulose. Any suitable reagent can be employed, but phosphites ammonia and amines are preferred for this purpose.

Phosphites which are desirably employed include the trialkyl phosphites of the formula:

$$(R^3O)_3P$$

wherein $R^3$ is lower alkyl, preferably a secondary or tertiary lower alkyl group. The conditions for this reaction are similar to those described above.

As an alternative to the use of trialkyl phosphites, ammonia or amines may be employed to replace the halogen, in this case with an amino group. Suitable amines include primary, secondary and tertiary amines, whether aromatic, aliphatic, or heterocyclic in nature, with those having at least about 20 weight percent nitrogen. Illustrative examples include methylamine, ethylamine, isopropylamine, propylamine, allylamine, butylamine, pentylamine, hexylamine, aniline, ethylenediamine, diethylenetriamine, triethylenetetramine, tetraethylenepentamine and similar polyamines, 1,2- and 1,3-propanediamines, 3-(dimethylamino) - propylamine, 3,3'-iminobis(propylamine), N,N,N',N' - tetramethyl-1,3-butanediamine, dimethylamine, diethylamine, dipropylamine, diisopropylamine, piperazine, aminoacetonitrile, glycinamide, trimethylamine, triethylamine, 1,4-diazobicyclo [2.2.2]octane, melamine, 5-aminotetrazole, ethylenimine, polyethylenimine, and the like.

One method for effecting reaction between cellulose modified by halophosphonate and amine-type compounds such as ammonium hydroxide and ethylenediamine is to add the nitrogen-containing compound slowly to the halosubstituted composition, preferably in a solvent such as 2-propanol, initially at 25±15° C. A moderately exothermic reaction normally results. Then the mixture is slowly heated to a temperature of 100±20° C. or the reflux temperature of the solvent, which is 80±5° C. with 2-propanol. Based on the amount of amine-type compound used, generally reaction is 95±5% complete within 4 to 24 hours, lower temperatures requiring the longer period. The extent of the reaction can be followed by periodic determinations of ionic chloride. At the end of the reaction period, the reaction mixture is cooled, liquids are removed, and the cellulose derivative (now containing both phosphorus and nitrogen) is rinsed free of the organic salt (amine hydrohalide) or ammonium chloride.

In order to avoid using some of the amine for neutralizing by-product hydrohalic acid, a favored procedure makes use of enough potassium bicarbonate or sodium bicarbonate to accomplish the neutralization as the replacement reaction proceeds. It can be dispersed in an alcohol, such as ethanol. The halogen-containing cellulose derivative and the nitrogen-containing compound, which may be similarly diluted, are added. Temperatures and times are of the same order of magnitude to those just recited. At the end of the reaction period, the new derivative of cellulose (now containing both phosphorus and nitrogen) is rinsed free of inorganic halide.

The use of ammonia or amines is particularly preferred because organic nitrogen has a synergistic effect on the flame retardance imparted by phosphorus. In general, when 6 to 10-ounce cotton fabric is treated with a tris (haloalkyl) phosphite as described above, little or no flame retardant effect is observed until at least about 1.5 weight percent phosphorus, based upon celluose, is present, and acceptable flame retardant properties are not achieved until the phosphorus content is at least about 2 percent. By incorporating sufficient organic nitrogen into the treatment, however, excellent flame retardant properties can be obtained at phosphorus contents as low as about 0.2 weight percent, despite the fact that the organic nitrogen compound is not a flame retarding agent alone.

This synergistic effect is obtained not only upon reaction of ammonia or an amine with the haloalkyl groups of the product of this invention, but whenever the cellulosic substrate is treated with an organic nitrogen compound in a manner such that the compound is deposited upon or reacted with the cellulose.

Suitable compounds for this purpose include organic compounds having a carbon-nitrogen linkage, with compounds wherein nitrogen is in the form of an amine or an amide group being preferred. Amide forms include the carboxamide (—CON<) and sulfonamide (—SO$_2$N<)

forms, with the carboxamide form being preferred. Particularly preferred nitrogen-containing compounds are those containing the linkage represented by the partial formula:

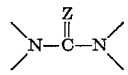

wherein Z is oxo, thioxo or substituted or unsubstituted imino; i.e., compounds containing the ureylene, thioureylene or guanidinylene linkages.

The free valences of the above linkage may be bonded to hydrogen, carbon or nitrogen. Preferred acyclic compounds containing this linkage may be represented by the general formula:

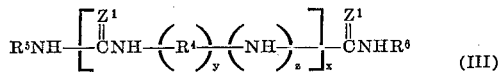

(III)

wherein each $Z^1$, when taken separately, is oxo, thioxo or imino; $R^4$ is a divalent hydrocarbylene, especially alkylene, radical of 1 to 5 carbons; $R^5$ and $R^6$ each are hydrogen, amino, cyano or hydrocarbyl or hydroxyhydrocarbyl, especially alkyl or hydroxyalkyl, of up to about 5 carbons;

each of $y$ and $z$ has a value of 0 or 1; and $x$ is an integer having a value of at least 0 and preferably of 0 or 1.

Illustrative compounds include urea, thiourea, guanidine, dicyandiamide, biguanide, semicarbazide, carbohydrazide, biurea, 1,1''-ethylenediurea, N,N'-dimethylolurea and the like.

Another class of nitrogen compounds are those heterocyclic compounds of the formula:

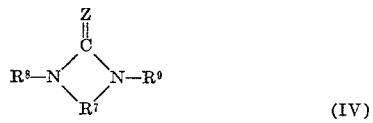

wherein Z is as defined above, $R^7$ is a divalent hydrocarbyl group, preferably alkylene, of up to 6 carbons, which, when taken with the NC(Z)N grouping, forms a 5- to 6-membered heterocyclic ring; and each $R^8$ and $R^9$ is hydrogen, lower hydrocarbyl, or lower hydroxyhydrocarbyl (e.g., lower alkyl or hydroxy lower alkyl of up to 6 carbons.)

Illustrative examples include 2-imidazolidinone, 2-imidazolidinethione, 2-iminoimidazolidine, N,N'-diethyl-2-imidazolidinone, N,N'-dimethylol - 2 - imidazolidinone and the like.

Still another class of useful nitrogen-containing heterocyclic compounds are the s-triazine derivatives of the formula:

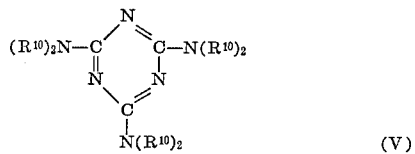

wherein each $R^{10}$, independently, is hydrogen, lower hydrocarbyl or hydroxy or alkoxy lower hydrocarbyl, (e.g., lower alkyl, hydroxy lower alkyl or lower alkoxy lower alkyl).

Illustrative compounds include melamine, $N^2,N^4,N^6$-trimethylmelamine, $N^2,N^4,N^6$-tris(hydroxymethyl)melamine, hexakis(methoxymethyl)melamine and the like.

In addition to these compounds, polyalkylenamines, preferably containing at least 4 nitrogen atoms per molecule, wherein the alkylene group has from 2 to about 6 carbons, are highly desirable nitrogen compounds.

In this embodiment, the cellulose can be treated with the organo-nitrogen compound before or after treatment with the tris(haloalkyl) phosphite. The technique employed in treating the cellulose with the organo-nitrogen compound is not a part of this invention, and in general will be known to those of ordinary skill in the art. It is preferred, however, that the organo-nitrogen compound, at least in the form in which present in the final product, be relatively non-volatile, such as a compound having a normal boiling point above about 200° C. and be resistant to removal by laundering. Particularly preferred organo-nitrogen compounds are those which are water soluble for ease of application but which can be rendered insoluble, as by polymerization or reaction with the cellulose.

The amounts of phosphorus and, if present, nitrogen are not critical to this invention, provided that they are at least sufficient to impart flame retardance. The specific amounts necessary for this purpose will depend upon the substrate and the standard of flame retardance employed.

For example, the substrate greatly influences the degree of flame retardance both on a molecular level and a macroscopic level. Thus, certain molecular forms of cellulose, for example, rayon, are more flammable than other forms, such as cotton. Similarly, certain physical forms, for example fibers of yarns, are more flammable than others, such as fabrics woven from the same fibers or yarns. Again, the density or surface area per unit weight affects flammability, light-weight fabrics (e.g. 4 ounces per square yard), being more flammable than heavier (e.g. 8-ounce) fabrics.

Similarly, the required amount of phosphorus (and nitrogen) will depend upon the particular standard of flame retardance employed. In this regard, it should be noted that no universal test has been devised to determine flame retardance. Indeed, there is no generally-accepted definition of the term. In most cases the article to be evaluated is tested under actual or simulated conditions of intended use, and the standard of flame retardance is related only to that use. As a result, the correlation of the degree of flame retardance obtained by a given flame-retardant agent on one cellulosic form with that obtained on a different cellulosic form based upon the teachings of the prior art is difficult, if not impossible.

As employed in this application, however, the term "flame retarding" is synonymous with "self-extinguishing." That is, flame-retardant properties obtain when, although the surface or article may burn when in direct contact with a flame source, the flame will go out once the source is removed rather than continue to propagate. One commonly employed test for determining flame retardance, as employed in this sense, is the so-called vertical flame test, which is generally applicable only to planar cellulose forms, for example cellulosic fabrics, whether bonded, knitted or woven, paper sheets and the like. In this test, a fixed flame source is applied to the bottom edge of a vertically held strip of the material for a given period of time and then removed. The length of the charred or burned portion, i.e., the "char length," of the sample is measured, and is the index of flame-retardant properties. On the other hand, the flame-retardant properties of wood treated to reduce flammability are frequently measured by the "crib" test (ASTM E 160–50), wherein 24 specimen pieces (½" x ½" x 3") are subjected to a flame at 315±8° C. for 3 minutes, and the percent weight loss and duration of glow are recorded. Still other tests have been devised for other forms of cellulose.

In the above-mentioned vertical flame test, it has been generally observed that the char length will be either less than about half of the sample, or the entire sample will be consumed. As a result, when employing a 10- or 12-inch by 2½ inch sample, flame-retardant properties are generally considered adequate if the char length is less than an arbitrarily selected value, generally 4½ to 6½ inches, depending upon fabric weight. As applied to an 8-ounce, woven cotton twill fabric, a char length of less than 5 inches is taken to signify an acceptable degree of flame retardance. To achieve this degree of flame retardance with 8-ounce cotton fabrics, the product produced in accordance with this invention should contain at least about 2 weight percent phosphorus, when no organic nitrogen is present. For lower phosphorus contents, there must be nitrogen in an amount equal to at least the value of the expression 6–3P where P is the weight percent phosphorus, based upon cellulose, in the range of from about 0.2 to about 2 percent. It should be noted that this expression is valid only for the specific substrate, although similar inverse relations will be observed with other substrates.

The treatment of his invention is applicable to cellulose in both textile and non-textile forms. Textile forms include filaments, fibers, yarns and fabrics (whether woven or non-woven, such as bonded and knitwear fabrics). The cellulose can be from any source, including such natural sources as seed hairs such as cotton, bast fibers such as flax (linen), ramie, jute or hemp, as well as synthetic sources, for example regenerated cellulose such as rayon, or modified rayon, and partially acylated cellulose such as partially acetylated cellulose. Non-textile forms include both fiber and non-fiber forms, such as wood, paper and cellulosic film, whether in native, regenerated or partially substituted form. The treatment of this invention, although of most benefit for wholly cellulosic materials, is generally useful for cellulosic materials containing at least about 30 weight percent cellulose, such as blended yarns and fabrics.

The following examples are illustrative. In the examples the following test methods were employed.

(1) Elemental analyses:

(a) Phosphorus content was determined by combustion according to the Schoniger technique followed by a colorimetric technique employing a molybdenum blue complex, or by Kjeldahl digestion followed by a colorimetric technique employing acetone-water to intensify the phosphomolybdate color. [Bernhart, et al., Anal. Chem., 27, 440 (1955)].

(b) Nitrogen content was determined by Kjeldahl digestion followed by either:
(1) The Nessler colorimetric technique, or
(2) Distillation as ammonia followed by titration.

(c) Covalently bound chlorine content was determined by hydrolysis to chloride ion followed by argentimetric titration.

(2) Vertical flame test—AATCC 34–1952, Char length reported in inches.

EXAMPLE 1

Six samples of 100% cotton fabric (weighing 8 ounces per square yard, made in a twill weave) were dried in an oven at 93±1° C. for 30 minutes, and weighed. They were immersed for periods varying from 15 to 480 minutes in 30 times their weight of a 25 weight percent solution of tris(2 - chloroethyl) phosphite in N,N - dimethylformamide at 150° C. After removal from the solution, each sample was rinsed in three portions of dimethylformamide, then in water, and re-dried in the oven for 30 minutes at 93±1° C. Each sample was analyzed and tested for fire resistance of the modified textile fabric using the vertical flame test. The results of these experiments are summarized as follows:

TABLE I

| Fabric sample | Reaction period, min. | Found incorporated in fabric, percent | | Vertical flame test, char length, in. |
|---|---|---|---|---|
| | | Cl | P | |
| A | 15 | 0.48 | 0.5 | BEL |
| B | 30 | 0.91 | 1.5 | 6.0 |
| C | 60 | 1.17 | 2.0 | 5.4 |
| D | 120 | 1.55 | 2.2 | 4.7 |
| E | 240 | 1.45 | 2.6 | 4.3 |
| F | 480 | 1.08 | 2.7 | 4.2 |

As is apparent from the data presented in the foregoing table, the degree of flame retardance increases with increasing phosphorus content, with an acceptable degree of flame retardance being obtained at about 2.0 to about 2.2 weight percent phosphorus.

EXAMPLE 2

Two samples of 100% cotton fabric (weighing 8 ounces per square yard, made in a twill weave, and dyed khaki) were conditioned at a relative humidity of 65±2% (21±1° C.) and weighed on an analytical balance. They were padded to 62 percent wet pick-up with a solution of 115 parts by weight of $N^2,N^4,N^6$-tris(hydroxymethyl)-melamine, 10 parts by weight of a 30 weight percent solution of hydrogen peroxide, and 875 parts by weight of water. The pre-treated samples were partially dried to a moisture content of 30±10%, steamed for 8 minutes, rinsed in a 0.1% aqueous solution of a nonionic detergent (isooctylphenol bound to 9–10 repeating units of ethylene oxide), rinsed in water, dried, and conditioned. The weight gain (corrected for moisture regain) was 5.7%, and the nitrogen content was found to be 3.1%.

Next, the samples were dried at 98±1° C. for 30 minutes, and weighed. They were immersed in 30 times their weight of a 25% solution of tris(2 - chloroethyl) phosphite in a dimethylformamide at 150° C. for reaction periods of 30 and 60 minutes, respectively. At the end of the reaction period, the samples were rinsed, dried, analyzed, and tested as in Example 1. In addition, the samples were subjected to 10 cycles of laundering with hypochlorite bleach and again evaluated for flame retardancy to ascertain durability. Processing conditions and evaluation results on the modified cellulosic fabric are tabulated below:

TABLE II

| Fabric sample | Reaction period, min. | Before laundering (but rinsed and dried) | | | | After 10 launderings with hypochlorite bleach | | |
|---|---|---|---|---|---|---|---|---|
| | | Found in fabric, percent | | | Char length, in. | Found in fabric, percent | | Char length, in. |
| | | Cl | N | P | | N | P | |
| A | 30 | 0.76 | 2.9 | 1.1 | 3.3 | 2.9 | 1.0 | 5.1 |
| B | 60 | 1.07 | 2.9 | 1.5 | 2.4 | 3.0 | 1.5 | 4.2 |

Note that flame retardancy of Sample A was good. Hence only 1.1% P is sufficient at a nitrogen level of 2.9%.

By comparing char lengths of the B samples of Examples 1 and 2 (both of which had 1.5% P), it is evident that the presence of combined nitrogen augmented the effectiveness of the bound phosphorus.

That the fixed compounds of nitrogen and of phosphorus are durably resistant to repeated laundering with bleach was borne out by the percentages of nitrogen and phosphorus, which remain unchanged (within experimental error) after 10 cycles. The increase in char length with repeated laundering possibly reflects some mechanical change in the physical structure of the textile brought about by numerous launderings.

EXAMPLE 3

Two samples of 100% cotton fabric (weighing 8 ounces per square yard, made in a twill weave, and dyed khaki) were dried in an oven at 93±1° C. for thirty minutes, and weighted. They were immersed for 1 hour in 30 times their weight of a 25 weight percent solution of tris(2-chloroethyl) phosphite in N,N-dimethylformamide at 140° C. for Sample A and 120° C. for Sample B. At the end of the reaction period, the samples were rinsed, dried, and evaluated for flame retardancy as in Example 1. Quantitative details are tabulated below. They indicate that the temperature should be in excess of 120° C. if sufficient reaction is to be achieved within an hour when excess tris(2-chloroethyl) phosphite is available from a 25% solution.

| Fabric sample | Reaction temp., ° C. | Weight gain, percent | Vertical flame test, char length, in. |
|---|---|---|---|
| A | 140 | 5.92 | 4.6 |
| B | 120 | 1.03 | BEL |

What is claimed is:
1. In a method for imparting flame-retardant properties to a cellulosic material in textile form by treatment with a phosphorus-containing compound, the improvement of reacting said cellulosic material with a tris(haloalkyl) phosphite of the formula:

$$P(OC_nH_{2n}X)_3$$

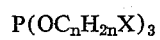

wherein $n$ is an integer having a value of at least 2 up to about 10 and X is halogen, at an elefated temperature whereby phosphorus becomes chemically bonded to the cellulosic material.

2. A process according to claim 1 wherein $n$ has a value of from about 2 to about 4.

3. A process according to claim 2 wherein said reaction is effected by immersing the cellulosic material in a solution of the tris(haloalkyl) phosphite in a chemically inert organic solvent which is a swelling agent for cellulose.

4. A process according to claim 3 wherein said solvent is a tertiary amide or lactam of the formula:

$$RCONR^1R^2$$

wherein R, when taken alone, is hydrogen or lower alkyl; each $R^1$ and $R^2$, when taken separately, is lower alkyl; and R and $R^1$, when taken together, are lower alkylene which, when taken with the N-substituted carbamoylene radical, forms a 5- to 7-membered heterocyclic ring.

5. A process according to claim 4 wherein said tris(haloalkyl) phosphite is tris(2-chloroethyl) phosphite, said solvent is N,N-dimethylformamide and said elevated temperature is in the range of from about 130° C. to about 170° C.

6. A product produced according to the process of claim 1.

7. A product produced according to the process of claim 5.

8. A process according to claim 1 wherein the product thereof is reacted with at least one of a trialkyl phosphite of the formula $(R^3O)_3P$ wherein $R^3$ is lower alkyl, ammonia or an amine containing at least about 20 weight percent nitrogen.

9. A product produced according to the process of claim 8.

10. A product according to claim 6 which contains phosphorus in an amount of at least 0.2 weight percent and nitrogen in an amount sufficient to impart flame-retardant properties to the product.

11. A product according to claim 10 wherein the cellulosic material is a cotton fabric, the amount of phosphorus is in the range of from about 0.2 weight percent to about 2 weight percent and the amount of nitrogen is at least the amount defined by the expression 6–3P wherein P is the phosphorus content.

12. A product according to claim 11 wherein the tris(haloalkyl) phosphite is tris(2-chloroethyl) phosphite.

References Cited

UNITED STATES PATENTS

| 2,678,330 | 5/1954 | Gorder et al. | 260—219 XR |
| 2,806,831 | 9/1957 | Beindorff | 260—45.7 XR |
| 2,990,233 | 6/1961 | Pacsu et al. | 260—219 XR |
| 3,027,349 | 3/1962 | Bahr et al. | 260—967 XR |
| 3,153,036 | 10/1964 | Merten | 260—967 XR |
| 3,285,774 | 11/1966 | Goldstein et al. | 117—136 |
| 3,412,052 | 11/1968 | Taylor et al. | 106—177 XR |

FOREIGN PATENTS 136,347   7/1960   U.S.S.R.

DONALD L. ARNOLD, Primary Examiner

L. B. HAYES, Assistant Examiner

U.S. Cl. X.R.

106—15, 177, 186, 190; 117—136; 252—8.1

PO-1050
(5/69)

UNITED STATES PATENT OFFICE
CERTIFICATE OF CORRECTION

Patent No. 3,507,610  Dated April 21, 1970

Inventor(s) Giuliana C. Tesoro, et al.

It is certified that error appears in the above-identified patent and that said Letters Patent are hereby corrected as shown below:

Column 3, line 12, "fo" should read --of--.
Column 4, line 41, after "radicals" insert a comma (,).
Column 6, left hand formula of the reaction sequence, the bottom portion should read -- $OCH_2CH_2Cl$ --. Column 7, line 21, "helogen" should read --halogen--. Column 8, line 74, "1,1" " should read -- 1,1' --. Column 11, line 71, "98 $\pm$ 1°" should read --93 $\pm$ 1°--. Column 12, line 66, "elefated" should read --elevated--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents